United States Patent
Lentner et al.

(10) Patent No.: US 8,391,437 B2
(45) Date of Patent: Mar. 5, 2013

(54) JET PUMP RISER BRACE CLAMP

(75) Inventors: Bruce J. Lentner, Wilmington, NC (US); Michael S. DeFilippis, Wilmington, NC (US)

(73) Assignee: GE-Hitachi Nuclear Energy Americas, LLC, Wilmington, NC (US)

( * ) Notice: Subject to any disclaimer, the term of this patent is extended or adjusted under 35 U.S.C. 154(b) by 962 days.

(21) Appl. No.: 12/482,521

(22) Filed: Jun. 11, 2009

(65) Prior Publication Data

US 2010/0316180 A1 Dec. 16, 2010

(51) Int. Cl.
*G21C 15/00* (2006.01)

(52) U.S. Cl. ........ 376/372; 376/370; 376/366; 376/361; 376/347

(58) Field of Classification Search .......... 376/347, 376/361, 366, 370, 372; 417/65, 76, 87; 248/200, 205.1, 229.2, 229.24, 351
See application file for complete search history.

(56) References Cited

U.S. PATENT DOCUMENTS

| | | | |
|---|---|---|---|
| 6,053,652 A | 4/2000 | Deaver et al. | |
| 6,086,120 A | 7/2000 | Deaver et al. | |
| 6,108,391 A | 8/2000 | Deaver | |
| 6,264,203 B1 * | 7/2001 | Weems et al. | 277/314 |
| 6,450,774 B1 | 9/2002 | Erbes et al. | |
| 6,463,114 B1 | 10/2002 | Wivagg | |
| 6,490,331 B2 | 12/2002 | Erbes | |
| 6,647,083 B1 | 11/2003 | Jensen | |
| 7,185,798 B2 * | 3/2007 | Butler | 228/44.5 |
| 7,272,204 B2 * | 9/2007 | Jensen | 376/260 |

* cited by examiner

*Primary Examiner* — Jack W Keith
*Assistant Examiner* — Marshall O'Connor
(74) *Attorney, Agent, or Firm* — Ryan Alley Intellectual Property Law

(57) ABSTRACT

An embodiment of the present invention takes the form of an apparatus or system that may reduce the level of vibration experienced by an inlet riser or other similar object within a reactor pressure vessel. An embodiment of the present invention may eliminate the need for welding the riser brace to the inlet riser. An embodiment of the present invention provides at least one riser brace clamp that generally clamps the riser brace to the inlet riser. After installation, the riser brace clamp may lower the amplitude of, and/or change the frequency of, the vibration experienced by the inlet riser.

20 Claims, 5 Drawing Sheets

JET PUMP RISER BRACE CLAMP

BACKGROUND OF THE INVENTION

The present invention relates generally to the welds between that connect some components of a nuclear reactor pressure vessel; and more particularly to an apparatus and system for replacing the welds between components.

A non-limiting example of a nuclear reactor, a conventional boiling water reactor (BWR) is shown in FIGS. 1-3. A typical BWR includes: a reactor pressure vessel (RPV) 10, a core shroud 30 disposed within the RPV 10, and a nuclear fuel core 35. The core shroud 30 is a cylinder that surrounds the nuclear fuel core 35, which includes a plurality of fuel bundle assemblies 40 disposed within the core shroud 30. A top guide 45 and a core plate 50 supports each of the fuel bundle assemblies 40.

An annular region between the core shroud 30 and the RPV 10 is considered the downcorner annulus 25. Coolant water flows through the downcorner annulus 25 and into the core lower plenum 55. Feedwater enters the RPV 10 via a feedwater inlet 15 and is distributed circumferentially within the RPV 10 by a feedwater sparger 20, which is adjacent a core spray line 105. Then, the water in the core lower plenum 55 flows upward through the nuclear fuel core 35. In particular, water enters the fuel bundle assemblies 40, wherein a boiling boundary layer is established. A mixture of water and steam exits the nuclear fuel core 35 and enters the core upper plenum 60 under the shroud head 65. The steam-water mixture then flows through standpipes 70 on top of the shroud head 65 and enters the steam separators 75, which separate water from steam. The separated water is recirculated to the downcorner annulus 25 and the steam exits the RPV 10 via a nozzle 110 for use in generating electricity and/or in another process.

As illustrated in FIG. 1, a conventional jet pump assembly 85 comprises a pair of inlet mixers 95. Each inlet mixer 95 has an elbow welded thereto, which receives pressurized driving water from a recirculation pump (not illustrated) via an inlet riser 100. Some inlet mixers 95 comprise a set of five nozzles circumferentially distributed at equal angles about an axis of the inlet mixer 95. Here, each nozzle is tapered radially and inwardly at the nozzle outlet. This convergent nozzle energizes the jet pump assembly 85. A secondary inlet opening (not illustrated) is located radially outside of the nozzle exit. Therefore, as jets of water exit the nozzles, water from the downcorner annulus 25 is drawn into the inlet mixer 95 via the secondary inlet opening, where mixing with water from the recirculation pump occurs.

The BWR also includes a coolant recirculation system, which provides the forced convection flow through the nuclear fuel core 35 necessary to attain the required power density. A portion of the water is drawn from the lower end of the downcorner annulus 25 via a recirculation water outlet 80 and forced by the recirculation pump into a plurality of jet pump assemblies 85 via recirculation water inlets 90. The jet pump assemblies 85 are typically circumferentially distributed around the core shroud 30 and provide the required reactor core flow. A typical BWR has between sixteen to twenty-four inlet mixers 95.

Typically, each jet pump assembly 85 includes at least the following. A transition piece 120, a riser pipe 130 extending downwardly from the transition piece 120 to an riser elbow 135. The riser elbow 135 connects the riser pipe 130 to a recirculation inlet 90 along a wall of the RPV 10. A pair of inlet mixers 95 extends downwardly from the transition piece 120 to a pair of diffusers 115 mounted over holes in a pump deck 125. The pump deck 125 connects a bottom portion of the core shroud 30 with the RPV 10. The riser pipe 130 is typically tubular and is oriented vertically within the downcorner annulus 25, in parallel relation to the wall of the core shroud 30. The riser elbow 135 is typically tubular and bends outwardly toward the recirculation inlet 90. The transition piece 120 extends in opposite lateral directions at the top of the riser pipe 130 to connect with the inlet mixers 95 on opposite sides of the riser pipe 130. The inlet mixers 95 are oriented vertically in the downcorner annulus 25 in parallel relation to the riser pipe 130. Restrainer brackets 140, located between the inlet mixers 95 and the riser pipe 130, provide lateral support for the inlet mixers 95.

Typically, the riser pipe 130 is supported and stabilized within the RPV 10 by a riser brace 145 (illustrated, for example, in FIG. 2) attached to the riser pipe 130 and to an attachment wall 149, which is typically a wall of the RPV 10. Commonly, the riser brace 145 is attached to the riser pipe 130 and to the attachment wall 149 by welding. The riser brace 145 ordinarily comprises a yoke 143 (FIG. 3) and side members 147 extending respectively from opposite ends of the yoke 143 in a spaced parallel relation. Typically, the yoke 143 has an inwardly curved surface between the side members 147, which is complementary to the outer curvature of the exterior surface of the riser pipe 130.

The riser brace 145 is disposed in the downcomer annulus 25 with the riser pipe 130 disposed between the side members 147. The riser brace 145 is normally attached to the riser pipe 130 via a weld between the inwardly curved surface and the exterior surface of the riser pipe 130. Here, the side members 147 generally transverse to the riser pipe 130 and extend from the yoke 143 and respective ends of the side members 147 attach to the attachment wall 149. The ends of the side members 147 are normally welded to the attachment wall 149. Alternatively, the ends of the side members 147 may be welded to an intermediary structure, such as, but not limiting of, braces, blocks or pads, with the intermediary structure being in turn welded to the attachment wall 149. Typically, each side member 147 comprises an upper leg and a lower leg disposed beneath the upper leg in spaced parallel relation therewith. The riser brace 145 generally provides lateral and radial support to the riser pipe 130. In addition, the riser brace 145 is designed to accommodate the differential thermal expansion resulting from RPV 10 operation, and to accommodate for flow-induced vibrations associated with the reactor water circulation system.

Intergranular stress corrosion cracking (IGSCC) resulting from corrosion, radiation and/or stress may occur in the welds between the riser braces 145 and the riser pipes 130 of jet pump assemblies 85 of an RPV 10. Cracks initiated by IGSCC or other causes in the welds between the riser braces 145 and the riser pipes 130 may grow to critical sizes for mechanical fatigue resulting from the vane passing frequencies of the recirculation pumps exceeding the excitation frequency of the riser braces 145. To avoid resonance, the natural frequency of the riser brace 145 should not be nearly equal to the vane passing frequency of the recirculation pumps (at any pump speed). If the vane passing frequency of the recirculation pumps equals or exceeds the natural frequency of the riser brace 145, then the riser brace 145 may potentially enter resonance; possibly to the detriment of the jet pump assembly 85.

A clamp apparatus for mechanically reinforcing the weld between a riser pipe and a riser brace is disclosed in U.S. Pat. No. 7,185,798 B2 to Butler. Here, the clamp apparatus augments the welded connection between the riser brace and the riser pipe. A clamp apparatus for stiffening a riser brace of a jet pump assembly 85 is disclosed in U.S. Pat. No. 6,647,083

B1 to Jensen. Here, the clamp apparatus is applied to the side members of the riser brace to shorten portions of the side members subject to vibration. The clamp apparatus does not attach to the riser pipe and does not augment the welded connection between the riser brace and the riser pipe.

Various clamps used in jet pump assemblies of boiling water reactors are represented by U.S. Pat. No. 6,463,114 B1 to Wivagg, U.S. Pat. No. 6,490,331 B2 to Erbes, U.S. Pat. No. 6,450,774 B1 to Erbes et al, U.S. Pat. Nos. 6,086,120 and 6,053,652 to Deaver et al, and U.S. Pat. No. 6,108,391 to Deaver. The Wivagg patent discloses a clamp used in conjunction with a jacking device to restrain the existing jack screws that are welded about the peripheries of the inlet mixers to provide lateral restraint for the inlet mixers within the restrainer brackets. The Erbes ('331) patent relates to a spring clamp for providing a tight fit between an inlet mixer 95 and a restrainer bracket. The Erbes et al ('120) patent discloses a clamp for being installed on a slip joint coupling an inlet mixer to a diffuser. The clamp is used to squeeze the diffuser to impart an oval deformation to the diffuser. The Deaver et al patents ('120 and '652) disclose a clamp apparatus for supporting the lower portion of a riser of a jet pump assembly. The clamp apparatus comprises an elbow clamp, a riser clamp and a bridge coupling the elbow and riser clamps. The riser clamp includes a pair of legs for being disposed on opposite sides of the riser pipe and a back portion rigidly connecting the legs in fixed relation. The Deaver ('391) patent relates to a clamp having upper and lower clamp elements receiving the outer end of a riser elbow between the upper and lower clamp.

There are a few possible problems with the currently known apparatuses, methods, and systems for dampening the vibration experience by the riser pipe 130. Currently known solutions require re-welding or integrate with existing welds, which may lead to a repeat failure. These apparatuses, methods, and systems also generally require longer installation time and expose operators to longer period of radioactivity. These apparatuses, methods, and systems may comprise many parts, which increase the assembly and installation time.

Based on the above discussion, operators of nuclear power plants may desire an apparatus and system for reinforcing the connection between a riser pipe 130 and a riser brace 145 of a jet pump assembly 85. The apparatus and system should not require welds between the riser pipe 130 and the riser brace 145. The apparatus and system should reduce a level of vibration experienced by the riser pip 130. The apparatus and system should require few parts allowing for a relatively quick assembly and installation.

BRIEF DESCRIPTION OF THE INVENTION

In accordance with an embodiment of the present invention, an apparatus for integrating a riser brace with an inlet riser of a jet pump assembly, wherein the inlet riser comprises a central longitudinal axis and the riser brace comprises first and second side members extending from a yoke which engages a portion of the inlet riser, and wherein the first and second side members extend transversely to the central longitudinal axis on opposite sides of the inlet riser, the apparatus comprising: a) a saddle for securing a position an inlet riser of a pressure vessel within a yoke of a riser brace, wherein the saddle comprises: an engagement surface for radially supporting a portion of the inlet riser, wherein the engagement surface allows for mating with the portion of the inlet riser; and a connection structure for maintaining a position of the engagement surface, wherein the connection structure is integrated with a portion of the engagement surface; and h) a securing structure for connecting the saddle to the riser brace, wherein the securing structure anchors the saddle to the inlet riser.

In accordance with another embodiment of the present invention, a system for dampening a level of vibration experienced by an object integrated within a nuclear power plant; the system comprising: a reactor pressure vessel (RPV); an inlet riser of a jet pump assembly within the RPV, wherein the inlet riser comprises a central longitudinal axis and the riser brace comprises first and second side members extending from a yoke which engages a portion of the inlet riser, and wherein the first and second side members extend transversely to the central longitudinal axis on opposite sides of the inlet riser; a saddle for securing a position the inlet riser within the yoke of the riser brace, wherein the saddle comprises: an engagement surface for radially supporting a portion of the inlet riser, wherein the engagement surface allows for mating with the portion of the inlet riser; and a connection structure for maintaining a position of the engagement surface, wherein the connection structure is integrated with a portion of the engagement surface; and a securing structure for connecting the saddle to the riser brace, wherein the securing structure anchors the saddle to the inlet riser.

DETAILED DESCRIPTION OF THE INVENTION

Certain terminology may be used herein for convenience only and is not to be taken as a limitation on the invention. For example, words such as "upper", "lower", "left", "front", "right", "horizontal", "vertical", "upstream", "downstream", "fore", and "aft" merely describe the configuration shown in the FIGS. Indeed, the components may be oriented in any direction and the terminology, therefore, should be understood as encompassing such variations unless specified otherwise.

As used herein, an element or step recited in the singular and preceded with "a" or "an" should be understood as not excluding plural elements or steps, unless such exclusion is explicitly recited. Furthermore, references to "an embodiment" of the present invention are not intended to exclude additional embodiments incorporating the recited features.

The following discussion focuses on an embodiment of the present invention integrated with the jet pump assemblies 85 of the RPV 10. Other embodiments of the present invention may be integrated with other systems that require a dampening of and/or frequency change in vibration.

The present invention takes the form of an apparatus or system that may reduce the level of vibration experienced by an inlet riser 100 or other similar object within a RPV 10. An embodiment of the present invention may eliminate the need for welding the riser brace 145 to the inlet riser 100. An embodiment of the present invention provides at least one riser brace clamp 150 that generally clamps the riser brace 145 to the inlet riser 100. After installation, the riser brace clamp 150 may lower the amplitude of, and/or change the frequency of, the vibration experienced by the inlet riser 100.

Figure 1:
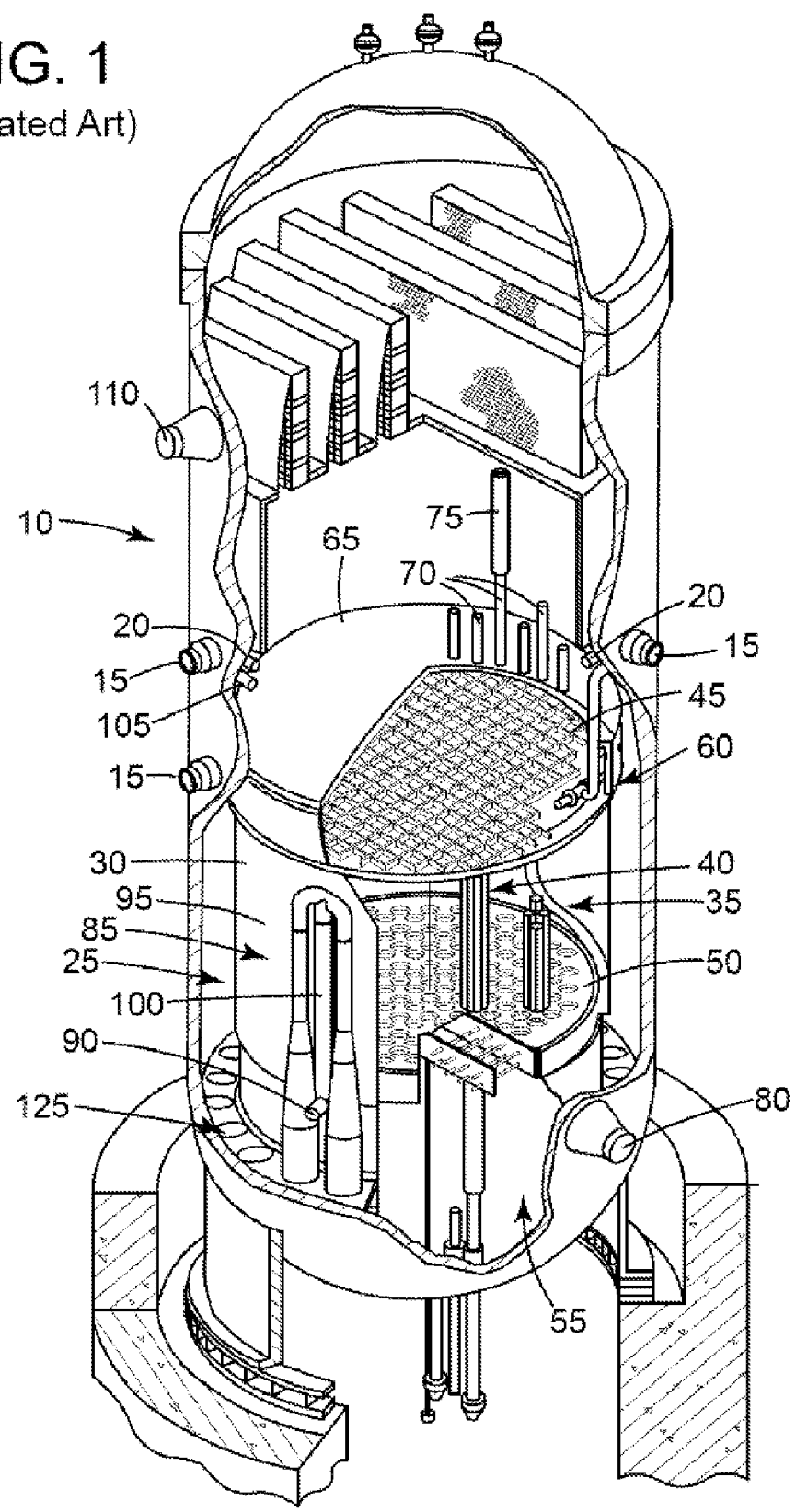
FIG. 1 is a schematic, illustrating a boiling water reactor partially in cross-section, within which an embodiment of the present invention operates.
Figures 2, 3:
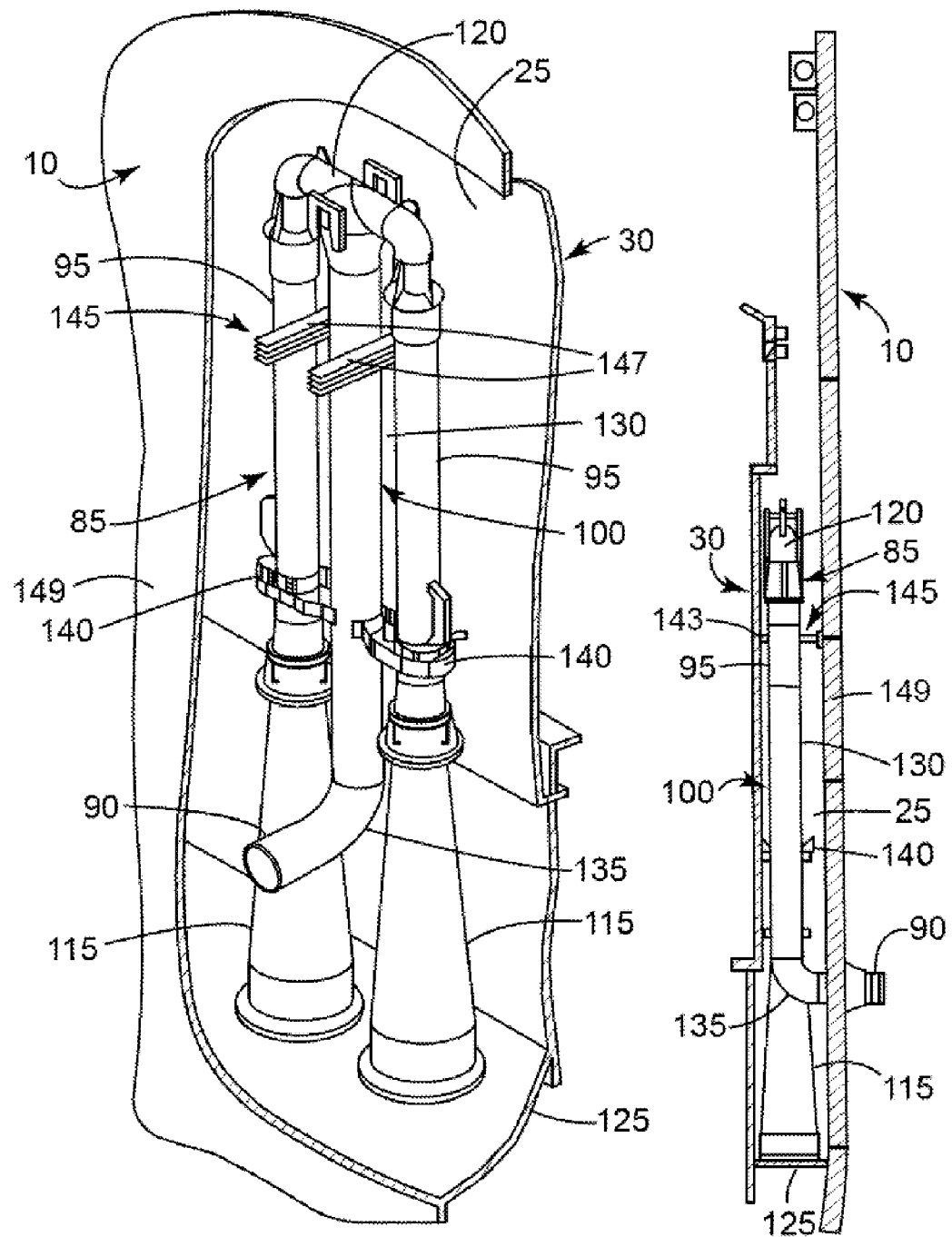
FIG. 2 is a schematic, illustrating the jet pump assembly portion of the boiler water reactor of FIG. 1.
FIG. 3 is a schematic, illustrating a side view of the jet pump assembly of FIG. 2, partially in cross-section.

Referring again to the FIGS., where the various numbers represent like parts throughout the several views. FIGS. 2 and 3 are schematics illustrating isometric and side views of a typically jet pump assembly 85 of a RPV 10. FIG. 2 is a schematic, illustrating the jet pump assembly 85 portion of the boiler water reactor of FIG. 1. FIG. 3 is a schematic, illustrating a side view of the jet pump assembly 85 of FIG. 2, partially in cross-section.

As discussed, the jet pump assembly 85 of the RPV 10 is generally disposed in the downcorner annulus 25 located between the RPV 10 and the core shroud 30. Generally, the jet pump assembly 85 comprises: a transition piece 120; an inlet riser 100 extending downwardly from the transition piece 120 to a recirculation inlet 90 along the exterior of a wall of the RPV 10; and a pair of inlet mixers 95 extending downwardly from the transition piece 120 to a pair of diffusers 115 mounted over holes in a pump deck 125, which connects a bottom portion of the core shroud 30 with the RPV 10. The inlet riser 100 generally includes: a tubular riser pipe 130 extending vertically and downwardly within the downcorner annulus 25 in parallel relation to the wall of the core shroud 30; and a tubular riser elbow 135 extending downwardly from the bottom of the inlet riser 100 and bending outwardly toward the recirculation inlet 90. The inlet riser 100 is ordinarily cylindrical and tubular with a longitudinally straight configuration between transition piece 120 and elbow 135. The outer end of the elbow 135 may be connected with a thermal sleeve in the recirculation inlet 90. The transition piece 120 may extend in opposite lateral directions at a top of the inlet riser 100 to connect with the inlet mixers 95 on opposite sides of the inlet riser 100. The inlet mixers 95 are typically oriented vertically in the downcorner annulus 25, in parallel relation to the inlet riser 100. Restrainer brackets 140 may be attached between the inlet mixers 95 and the inlet riser 100; and may provide lateral support for the inlet mixers 95.

A riser brace 145 may support and stabilize the inlet riser 100 in the region of the downcomer annulus 25. The riser brace 145 may also integrate the inlet riser 100 with an attachment wall 149 of the RPV 10. An embodiment of the riser brace 145 may generally have a U-shaped configuration. Here, the riser brace 145 may comprise a yoke 143 and first and second side members 147; which may extend in the same direction from opposite ends of the yoke 143 in a spaced parallel relation to terminate at respective side member ends 147. The periphery or footprint of the riser brace 145 may comprise an outer peripheral portion of generally U-shaped configuration, an inner peripheral portion of generally U-shaped configuration within the outer peripheral portion, and end peripheral portions connecting the outer and inner peripheral portions.

An embodiment of the present invention provides a riser brace clamp 150, which serves to connect the inlet riser 100 and the riser brace 145. As illustrated, for example in FIG. 5, an embodiment of the riser brace clamp 150 may fit around and clamp the riser brace 145 to the inlet riser 100.

Essentially, an embodiment of the riser brace clamp 150 comprises a saddle 155 and a securing structure 165, such as, but not limiting of, a riser clamp bracket 165. The securing structure 165 may connect the saddle 155 to the riser brace 145. Furthermore, in use, the securing structure 165 may anchor the saddle 155 to the inlet riser 100.

Figure 4:
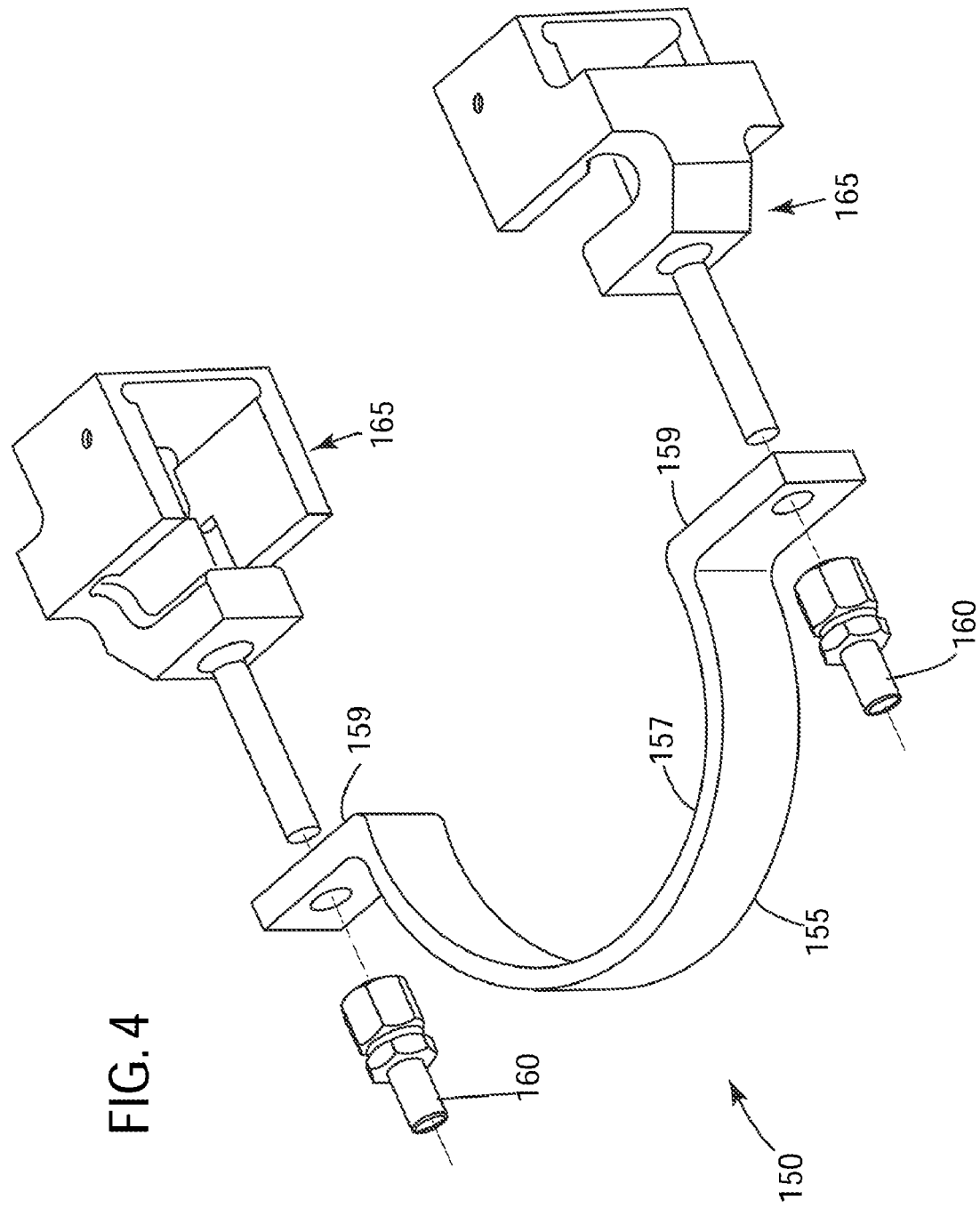
FIG. 4 is a schematic illustrating an exploded isometric view of an embodiment of a riser brace clamp, in accordance with an embodiment of the present invention.

FIG. 4 is a schematic illustrating an exploded isometric view of an embodiment of a riser brace clamp 150 in accordance with an embodiment of the present invention. As illustrated in FIG. 4, an embodiment of the present invention may comprise the following components. A saddle 155, two (2) fasteners 160, and two (2) riser clamp brackets 165, which collectively function as the aforementioned securing structure 165.

In an embodiment of the present invention, the saddle 155 may comprise an engagement surface(s) 157 and a connection structure(s) 159. The engagement surface 157 may serve to radially support a portion of the inlet riser 100 that may be engaging the yoke 143 of the riser brace 145. The engagement surface 157 may face an outer diameter of the inlet riser 100. The engagement surface 157 may be formed in a shape that allows for direct or indirect mating with the outer diameter of the inlet riser 100. For example, but not limiting of, if the inlet riser 100 is of a cylindrical shape, then the engagement surface 157 may have an arc or semi-circular shape having a similar radius as the outer diameter of the inlet riser 100, as illustrated in FIGS. 4-6.

The connection structure 159 may serve as the area(s) that allow the saddle 155 to be connected to the securing structure 165 of the repair brace clamp 150. The connection structure 159 may comprise a plurality of forms, such as, but not limiting of, a land, a boss, or any other surface integrated with the engagement surface 157 that allows for the position of the saddle 155 to be secured. In an embodiment of the present invention, the connection structure 159 may comprise the form of a first and a second connection surface 159. The first connection surface 159 may be located adjacent to an end of the engagement surface 157 and substantially parallel to the second connection surface 159, which may also be located adjacent to another end of the engagement surface 157. Here, each connection surface 159 may comprise at least one hole, as illustrated in FIG. 4, which allows for the saddle 155 to integrate with each riser clamp bracket 165.

In an embodiment of the present invention, the first and the second riser clamp brackets 165 may integrate with the riser brace 145 and allow for the saddle 155 to integrate with the same. Each riser clamp bracket 165 may comprise a mating shaft. The mating shaft generally allows for the few components of the repair brace clamp 150 to assemble. The mating shaft maybe positioned at a mounting position for mating with each hole on the connection surface 159 of the saddle 155.

Figure 5:
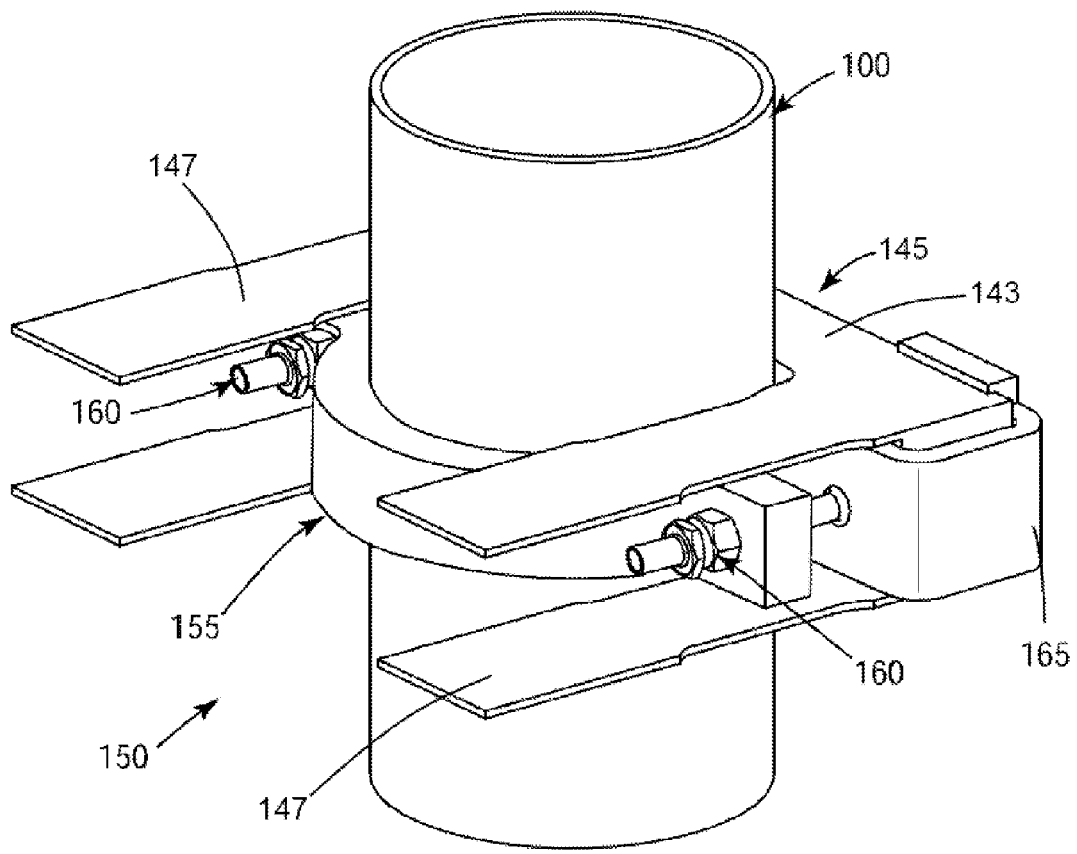
FIG. 5 is a schematic illustrating a plan view of a riser brace clamp installed on an inlet riser, in accordance with an embodiment of the present invention.
Figure 6:
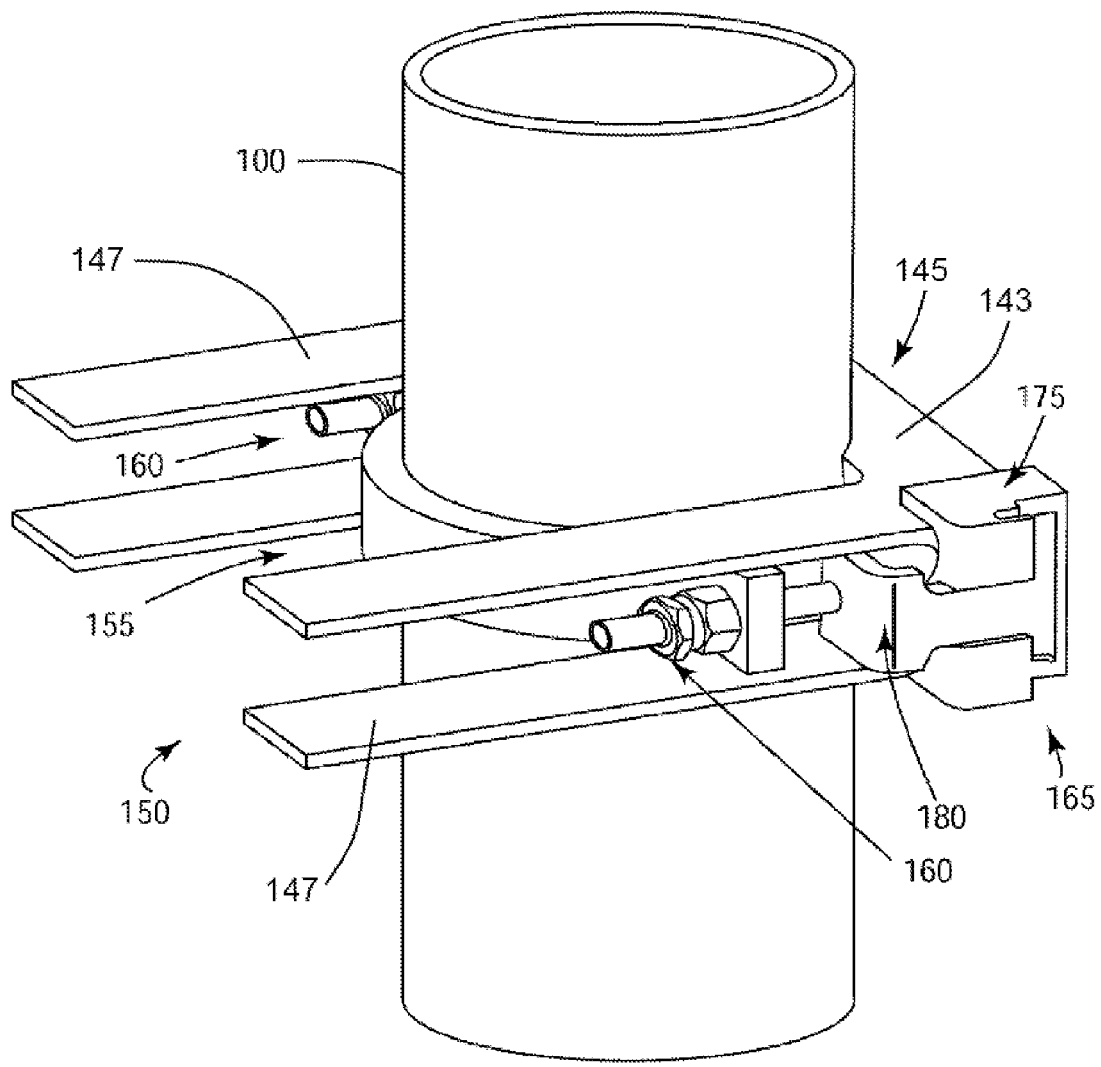
FIG. 6 is a schematic illustrating a plan view of a riser brace clamp installed on an inlet riser, in accordance with an alternate embodiment of the present invention.

In an embodiment of the present invention each riser clamp bracket 165 may comprise a one-piece structure, as illustrated in FIGS. 4 and 5. In an alternate embodiment of the present invention each riser clamp bracket 165 may comprise a multi-piece structure. Here, and as illustrated in FIG. 6, the riser clamp bracket 165 may comprise a base 175 and an arm 180. The base 175 may be slidably connected to a portion of the riser brace 145. The arm 180 may comprise the mounting shaft and may connect to the base 175 as illustrated.

The fasteners 160 generally serve to connect the saddle 155 to the riser brace 145. In use, the fasteners 160 may anchor the inlet riser 100 to the yoke 143 of the riser brace 145. An embodiment of the fastener 160 make comprise a nut have a crimp collar portion. This may prevent the fastener 160 from loosening after the saddle 155 is in a desired position.

FIG. 5 is a schematic illustrating a plan view of a riser brace clamp 150 installed on an inlet riser 100, in accordance with an embodiment of the present invention. Specifically, FIG. 5 illustrates a front isometric view of the riser brace 145. As illustrated, an embodiment of the present invention provides a relatively simple apparatus that may be quickly assembled and installed. First, the riser clamp brackets 165 may be connected to a rear portion of the riser brace 145. Next, the saddle 155 may be installed wherein the engagement surface 157 mates with the outer diameter of the inlet riser 100. Lastly, the fasteners 160 may secure the position on the repair brace clamp 150 to the repair clamp 200.

FIG. 6 is a schematic illustrating a plan view of a riser brace clamp 150 installed on an inlet riser 100, in accordance with an alternate embodiment of the present invention. Here, the base 175 may slide over a portion of the riser brace 145 and the arm 180 may then integrate with the base 175. This embodiment may allow for a rapid installation of the repair brace clamp 150, which may not require the removal of the riser brace 145 or the inlet mixer 95.

The components of an embodiment present invention may be formed of any material capable of withstanding the operating environment to which the riser brace clamp 150 may be exposed.

In use, the riser brace clamp 150 may clamp around the inlet riser 100 and the riser brace 145 at a location of the previous welds. When fully engaged, the riser brace clamp 150 may provide for generous clearance around the inlet riser 100. The riser brace clamp 150 may also reduce the vibration experience by the inlet riser 100.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omissions, additions and equivalents as may be included within the spirit and scope of the invention as defined by the following claims. For example, but not limiting of, an embodiment of the present invention may be used to: a) introduce a different vibration mode; b) to secure a pipe, cable, wire, or other similar object, at a fixed distance away from a separate structure or other object; or c) to apply a compressive load to at least one of the aforementioned objects.

What is claimed is:

1. An apparatus for securing an inlet riser to a means for bracing the riser, the apparatus comprising:
   a saddle shaped to mate with a surface of the inlet riser, wherein the saddle includes a plurality of connection structures;
   a plurality of riser clamp brackets configured to secure to the means for bracing the riser, wherein,
      each of the riser clamp brackets includes a mating structure configured to mate with a corresponding connection structure of the plurality of connection structures,
      a mating of the mating structures and the corresponding connection structures draws the saddle to the riser clamp brackets in only a first direction perpendicular to a longitudinal axis of the inlet riser, and
      the mating draws the saddle to the surface of the inlet riser in the first direction.

2. The apparatus of claim 1, wherein the saddle has a semicircular shape matching a portion of an outer perimeter of the inlet riser.

3. The apparatus of claim 1, wherein the connection structures each include a flat surface with a hole, and wherein the mating structures each include a mating post shaped to pass through the hole of the corresponding connection structure.

4. The apparatus of claim 3, wherein the mating post extends in the first direction.

5. The apparatus of claim 4, further comprising:
   a plurality of fasteners each configured to join to a corresponding mating post of the mating posts after passing through the hole of the corresponding connection structure, wherein the fasteners bias the saddle against the riser clamp brackets in the first direction and bias the saddle against the inlet riser in the first direction.

6. The apparatus of claim 5, wherein the mating posts are threaded and wherein the fasteners are nuts each configured to screw down on the corresponding mating posts in the first direction.

7. The apparatus of claim 1, wherein the saddle is a single, continuous piece that directly mates with the riser clamp brackets and with the inlet riser.

8. The apparatus of claim 1, wherein the saddle is shaped to fit in an axial separation between two side members of the means for bracing the riser and join to the riser clamp brackets in the axial separation.

9. The apparatus of claim 1, wherein each of the riser clamp brackets is a single, continuous piece that is configured to directly secure to the means for bracing the riser.

10. A damping system for use in a nuclear power plant, the system comprising:
    a reactor pressure vessel;
    a jet pump assembly including an inlet riser having a longitudinal axis extending vertically parallel to a surface of the reactor pressure vessel;
    a riser brace extending perpendicular to the longitudinal axis from an attachment wall, wherein,
       the riser brace includes a plurality of first side members and a plurality of second side members, wherein
          the first side members and second side member extend around the inlet riser on opposite sides of the inlet riser,
          the first side members are separated from each other in the longitudinal direction, and
          the second side members are separated from each other in the longitudinal direction, and
       the riser brace includes a yoke mating with the first and the second side members and biasing the inlet riser in only a first direction perpendicular to the longitudinal axis and toward the attachment wall;
    a riser brace clamp including,
       a saddle shaped to mate with a surface of the inlet riser, wherein the saddle includes a plurality of connection structures,
       a plurality of riser clamp brackets configured to secure to the riser brace, wherein,
          each of the riser clamp brackets includes a mating structure configured to mate with a corresponding connection structure of the plurality of connection structures,
          a mating of the mating structures and the corresponding connection structures draws the saddle to the riser clamp brackets in a second direction opposite the first direction, and
          the mating draws the saddle to the surface of the inlet riser in the second direction.

11. The system of claim 10, wherein the saddle has a semicircular shape matching a portion of an outer perimeter of the inlet riser.

12. The system of claim 10, wherein the connection structures each include a flat surface with a hole, and wherein the mating structures each include a mating post shaped to pass through the hole of the corresponding connection structure.

13. The system of claim 12, wherein the mating post extends in the second direction.

14. The system of claim 13, wherein the riser brace clamp further includes a plurality of fasteners each configured to join to a corresponding mating post of the mating posts after passing through the hole of the corresponding connection structure, wherein the fasteners bias the saddle against the riser clamp brackets in the second direction and bias the saddle against the inlet riser in the second direction.

15. The system of claim 14, wherein the mating posts are threaded and wherein the fasteners are nuts each configured to screw down on the corresponding mating posts in the second direction.

16. The system of claim 10, wherein the saddle is a single, continuous piece that directly mates with the riser clamp brackets and with the inlet riser.

17. The system of claim 10, wherein the saddle is shaped to fit and join to the riser clamp brackets between two axially adjacent first side members, and wherein the saddle is shaped to fit and join to the riser clamp brackets between two axially adjacent second side members.

18. The system of claim 10, wherein each of the riser clamp brackets is a single, continuous piece that directly secures to the yoke of the riser brace.

19. The system of claim 10, wherein, for each of the jet pump assembly, there is only a single of the riser brace clamp having only a single of the saddle and only two of the riser clamp brackets.

20. The system of claim 19, wherein the single saddle is shaped to fit and join to the two riser clamp brackets between two axially adjacent first side members, and wherein the single saddle is shaped to fit and join to the two riser clamp brackets between two axially adjacent second side members.

* * * * *

UNITED STATES PATENT AND TRADEMARK OFFICE
CERTIFICATE OF CORRECTION

PATENT NO. : 8,391,437 B2
APPLICATION NO. : 12/482521
DATED : March 5, 2013
INVENTOR(S) : Lentner et al.

Page 1 of 1

It is certified that error appears in the above-identified patent and that said Letters Patent is hereby corrected as shown below:

In the Specifications:

In Column 1, line 19, line 20, line 32, and line 53; Column 2, lines 2-3 and 9; and Column 5, lines 30 and 42, each occurrence of "downcorner" should read --downcomer--

Signed and Sealed this
Twenty-first Day of May, 2013

Teresa Stanek Rea
*Acting Director of the United States Patent and Trademark Office*